United States Patent
De Crasto

(10) Patent No.: US 11,352,192 B2
(45) Date of Patent: Jun. 7, 2022

(54) DEVICE FOR SERVING BY SINGLE GLASSES

(71) Applicant: Noxoe. Unipessoal LDA, Quarteira (PT)

(72) Inventor: Laurent De Crasto, Bordeaux (FR)

(73) Assignee: NOXOE. UNIPESSOAL LDA, Loulé (PT)

( * ) Notice: Subject to any disclaimer, the term of this patent is extended or adjusted under 35 U.S.C. 154(b) by 142 days.

(21) Appl. No.: 16/603,066

(22) PCT Filed: Apr. 9, 2018

(86) PCT No.: PCT/EP2018/059010
§ 371 (c)(1),
(2) Date: Oct. 4, 2019

(87) PCT Pub. No.: WO2018/185334
PCT Pub. Date: Oct. 11, 2018

(65) Prior Publication Data
US 2021/0107721 A1 Apr. 15, 2021

(30) Foreign Application Priority Data

Apr. 7, 2017 (FR) ........................................ 1753053

(51) Int. Cl.
*B65D 81/24* (2006.01)
*C12H 1/14* (2006.01)

(52) U.S. Cl.
CPC ............ *B65D 81/24* (2013.01); *C12H 1/14* (2013.01)

(58) Field of Classification Search
CPC .... B65D 81/24; B65D 81/2069; B65D 90/48; C12H 1/14; A23L 3/3445
(Continued)

(56) References Cited

U.S. PATENT DOCUMENTS 4,402,429 A * 9/1983 Vanden Driessche ...................... B67D 1/0412
222/153.01
4,702,396 A 10/1987 Gwiazda
(Continued)

FOREIGN PATENT DOCUMENTS

EP 1 352 873 A1 10/2003
WO 2005/058744 A2 6/2005

OTHER PUBLICATIONS

French Search Report dated Jan. 25, 2017, by the French Patent Office in corresponding French Patent Application No. 1753053. (3 pages).
(Continued)

*Primary Examiner* — Vishal Pancholi
*Assistant Examiner* — Robert K Nichols, II
(74) *Attorney, Agent, or Firm* — Buchanan Ingersoll & Rooney PC

(57) ABSTRACT

The invention relates to a device for pouring fluid (F) stored in a container (20) by inclining the container (20), the device (10) comprising: —a first part (100) comprising at least one collecting orifice (130) for collecting the fluid in the container (20), —a second part (150), which comprises fluid pouring means (160) that can be fluidically connected to the collecting orifice (130), —sealing means (190) separating the first part (100) and the second part (150), configured to seal the container when the device (10) is mounted on the container (20), the device being characterized in that the first part (100) also comprises a gas reservoir (110) and a degassing orifice (120) for evacuating gas from the reservoir (110) to the interior of the container (20).

15 Claims, 6 Drawing Sheets

Figure 1:
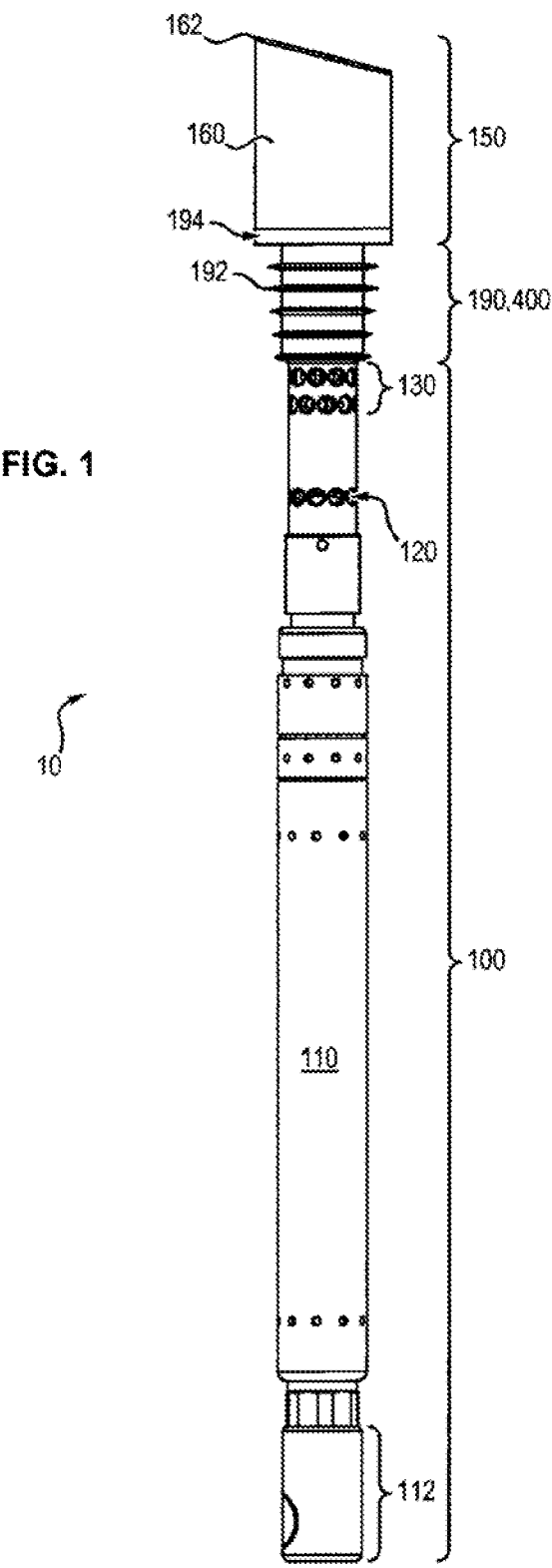

(58) Field of Classification Search
USPC .... 222/399, 152, 164, 604, 23; 99/347, 532, 99/533, 534, 535; 426/115, 118, 592
See application file for complete search history.

(56) References Cited

U.S. PATENT DOCUMENTS

| | | | |
|---|---|---|---|
| 6,086,045 A * | 7/2000 | Moon | F16K 41/103 |
| | | | 251/109 |
| 6,415,963 B1 | 7/2002 | Vlooswijk et al. | |
| 2013/0233878 A1 | 9/2013 | Lindmayer | |
| 2016/0207752 A1* | 7/2016 | Bazoberry | A23L 2/44 |

OTHER PUBLICATIONS

International Search Report dated Jun. 6, 2018, by the European Patent Office in corresponding International Patent Application No. PCT/EP2018/059010 and an English translation of the Report. (7 pages).

"Agriculture Biologique Fiche Vinification-Oenologie," Mar. 1, 2012, retrieved from https://www.sud-et-bio.com/sites/default/files/Plaquette%20vin%20bio%20Bureau%20Veritas.pdf on May 25, 2018. (2 pages).

International Preliminary Report on Patentability and Written Opinion dated Oct. 8, 2019, by the European Patent Office in corresponding International Patent Application No. PCT/EP2018/059010 and an English translation of the Written Opinion. (14 pages).

* cited by examiner

FIG. 3a
FIG. 3b
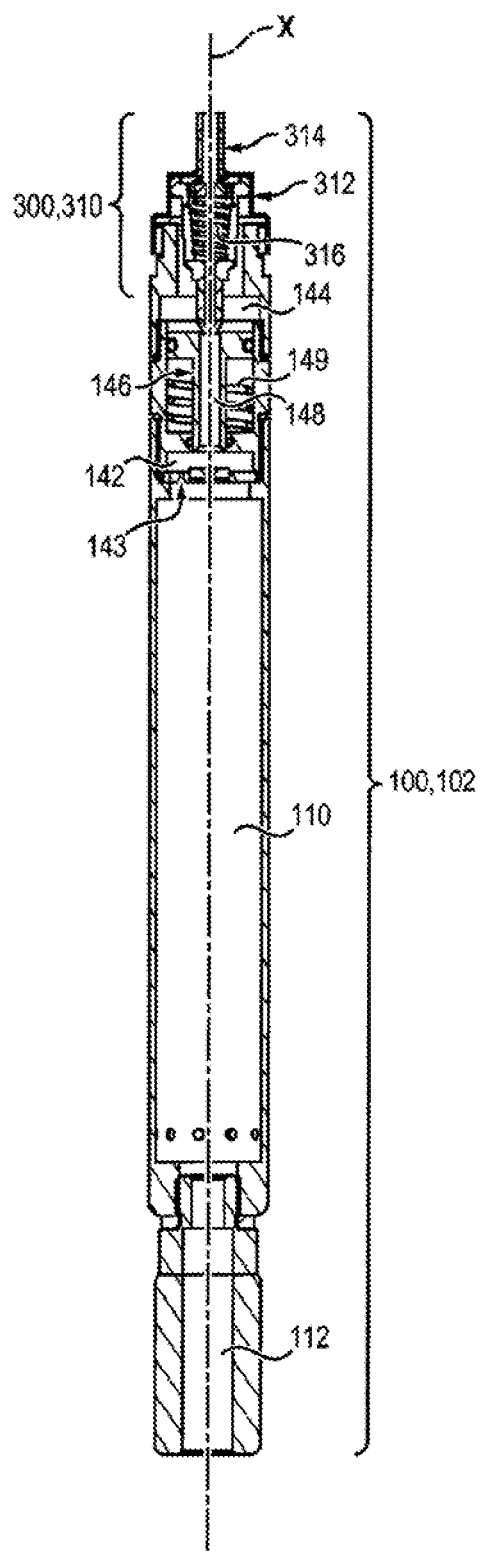
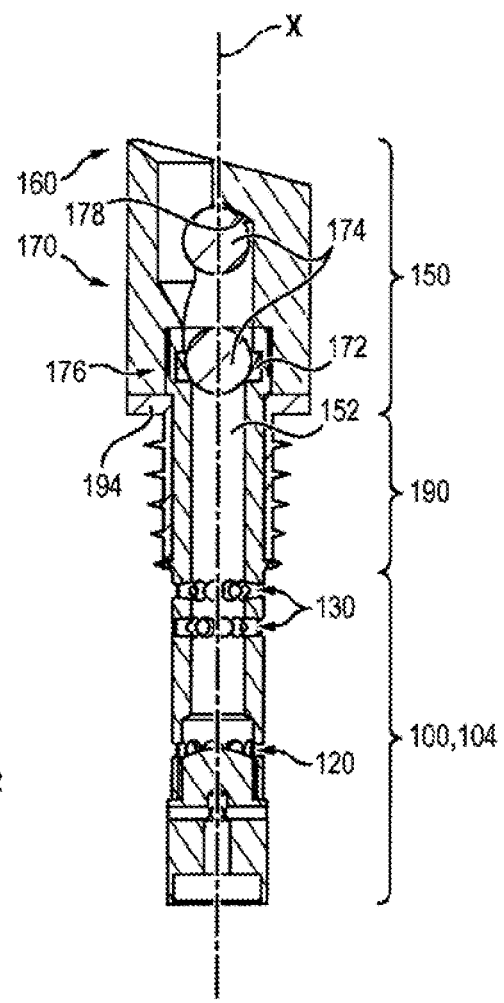

DEVICE FOR SERVING BY SINGLE GLASSES

GENERAL TECHNICAL FIELD

The invention relates to the field of devices for serving a liquid from a container, the liquid having to be stored after opening in a preferably inert gas to prevent it from degrading.

The invention relates more specifically to the field of wines, spirits and fermented beverages, whose preservation after opening in the ambient air is limited to a few days or even hours, beyond which the sensory properties are degraded.

The invention also finds application in cosmetic, pharmaceutical products (medicine, beauty product, etc.).

STATE OF THE ART

In the context of wines, it happens that the volume of the bottle is not suitable for the desired consumption: this is for example the case upon service called service by single glasses, that is to say when a customer orders only one glass, usually of fine wine. It is a common practice in catering, hotel trade, wine bars, or more and more among private individuals.

Once uncorked, the wine oxidizes upon contact with air and loses its properties, which generates a waste in terms of consumption—the remainder of the bottle can be lost if it is not drunk quickly, of product—the fine wines are rare—and secondarily of finance—the fine wines are expensive.

There is therefore a need for devices that would preserve the wine after opening of the bottle, while allowing access to the wine to drink it. In other words, the device must be adapted so that an operator can serve wine from the bottle without too many complications being generated.

Several types of devices that aim to meet this need are known.

A first solution, developed by Enomatic, comes in the form of a cabinet that can generally accommodate a plurality of bottles. Each bottle, after uncorking, is engaged in a plug in the form of a cap secured to the cabinet, which sucks wine inside the bottle disposed vertically concomitantly with the injection of inert gas. This wine is then discharged into a glass via an outer spout.

Document EP1352873 discloses such a solution. Nevertheless, this solution has several disadvantages.

The first disadvantage is the space occupied by the cabinet. It is in this case furniture-device for serving wine.

The second disadvantage is the complexity of the device, and therefore its cost, which makes it not very accessible to all catering or hotel services, as well as to the bars and a fortiori to the private individuals. The device requires a new apprenticeship to serve wine.

The third disadvantage is the loss of the ritual associated with the service and product. The consumer can no longer look at the bottle or hold it in his hands, and there is no longer the gesture of bottle tilting to pour the wine by single glasses. A desecration and a loss of folklore associated with the event of tasting the wine are thus observed.

A second solution, developed by Coravin, comes in the form of a portable device that can be mounted on an uncorked bottle of wine, as soon as it is desired to pour a glass. This device comprises a body with a needle, an inert gas cartridge, a spout and a fluid communication system with a valve. Once the body is engaged with the neck of the bottle, the needle perforates the cap to allow a liquid and gas exchange between the interior of the bottle and the fluid communication system, the gas cartridge and the spout. Then, it is sufficient to tilt the bottle and activate the valve, for example by pressure on a trigger, to pour a glass of wine.

Once the glass is served, the device can be removed and the cap is supposed to seal again naturally.

Document WO2005058744 describes such a solution. This solution has the advantage of being portable and not requiring particular furnishings, which makes it accessible to most users.

Nevertheless, this solution has several disadvantages.

The first disadvantage is nevertheless the increase in the volume of the bottle, which comprises the device attached to its neck. In addition to the generated space requirement that can constitute an inconvenience on a table, the device distorts the general shape of the bottle. Finally, this disrupts its gripping and there is a need to get used to pressing the trigger to serve.

The second disadvantage is the difficulty related to the drilling of the cap with the needle, which can be long and delicate. As the drilling is a through drilling, unlike a corkscrew, there is a risk that part of the cap falls into the wine, particularly when the cap has degraded.

The third disadvantage is again the loss of part of the ritual. If the possibility of tilting the bottle is retained, the device requires not uncorking the bottle, a major moment in the life of a wine.

A third solution, developed by Wikeeps, is a hybrid solution between the two solutions presented above. This solution comes in the form of a device comprising a body, a pipe, a gas cartridge, an outer spout and a fluid communication system with a valve. After uncorking the bottle, the body is inserted into the neck in a sealed manner, and the pipe is immersed in the wine. Then it is sufficient to activate the valve, for example by pressure on a trigger, so that the gas cartridge injects, via the fluid communication system, inert gas into the bottle and causes the exit of wine, which is poured via the spout.

The general principle is identical to that of the first solution: the bottle is maintained upright upon pouring of the wine and the wine is discharged through an outer spout. However, the device is portable, like in the second solution.

This solution nevertheless has disadvantages in the two aforementioned solutions, namely a distortion of the shape of the bottle, a loss of ritual related to the pouring of the glass and a complication of the gesture to serve a glass.

Thus, there is currently no solution that is space-saving, efficient, affordable and simply usable by a large number of people, and that does not distort the ritual related to the tasting of a glass of wine.

More generally, there is a need for a device that would pour a liquid from a container that distorts as little as possible the habits related to this container.

PRESENTATION OF THE INVENTION

To this end, the invention proposes a device for pouring fluid stored in a container, by tilting of the container, the device comprising:
  a first portion which comprises at least one collection port for collecting the fluid from the container, said first portion being configured to be located inside the container when the device is mounted on the container,
  a second portion which comprises fluid pouring means able to be in fluid communication with the collection port, sealing means separating the first portion and the second portion, configured to obturate the container in a sealed manner when the device is mounted on the container, the second portion being configured to be outside the container when the device is mounted on the container, the device being characterized in that the first portion further comprises a gas reservoir and a degassing port to remove gas from the reservoir towards the interior of the container.

This device, essentially housed inside the bottle, does not distort its normal use and simplifies the pouring of the liquid by single glasses.

In one embodiment, the first portion further comprises a control valve for controlling the gas flow rate towards the degassing port.

In one embodiment, the collection port is located in the vicinity of the sealing means, and preferably in an adjacent manner and still preferably as close as possible to the sealing means.

This allows limiting the liquid losses by enabling the pouring of almost the entire bottle. In addition, the little liquid remaining in the container may comprise unwanted residues, as in the case of wine, which therefore prevents them from being poured.

In one embodiment, the collection port and the pouring means are in fluid communication via an internal fluid communication channel, said channel comprising a shutter element able to obturate or open the communication channel.

In one embodiment, the opening or obturating position of the shutter element depends on the pressure inside the container and/or the spatial orientation of the device.

This allows simplifying as much as possible the use of device and the container is used as a normal container.

In one embodiment, the shutter element comprises return means tending to maintain the shutter element in the obturating position.

This allows in particular having pressurized fluids thereinside, or adjusting the sensitivity of the device for the pouring.

In one embodiment, the return means of the shutter element further comprise a deactivation mechanism for deactivating the return means.

This is in particular useful for pressurized fluids, so that the pouring is still done at atmospheric pressure, to avoid the geyser effect.

In one embodiment, the control valve is a valve driven by the orientation in the space of said device.

It is therefore sufficient to normally pour the container in order to use the device.

In one embodiment, the control valve is a tilt valve comprising two portions pivoting relative to each other, the pivoting being caused by the effect of the weight in particular of the gas reservoir when the device is tilted.

In one embodiment, the control valve is able to be manually activated by a switch.

It is thus sufficient to press a button in order to allow the pouring.

In one embodiment, an expander connects the reservoir to the control valve.

The expander allows switching from a high pressure (that of the reservoir) to a lower pressure.

In one embodiment, the sealing means comprise a finned annular seal, to fit different diameters of the container neck.

In one embodiment, means for maintaining the device on the bottle and, preferably, in which the sealing means act as maintaining means.

In one embodiment, the sealing means extend by a certain distance along the longitudinal direction, in order to resist the torque induced by the first portion when the container is tilted.

The sealing means then act as maintaining means.

In one embodiment, the gas reservoir comprises a recharging coupler for recharging said reservoir with pressurized gas.

In one embodiment, the first portion has an elongate shape along a longitudinal direction.

In one embodiment, the first portion has a tubular shape along a longitudinal direction.

In one embodiment, the fluid pouring means comprise a spout, typically with a sharp edge.

In one embodiment, the device comprises successively, along a longitudinal direction, the reservoir, then preferably a control valve, then the degassing port, then the fluid collection port, then the sealing means then the fluid pouring means, and preferably comprises an expander between the reservoir and the control valve.

In one embodiment, the maximum diameter of the first portion is less than 16 mm, so that the device is in particular suitable for a container in the form of a standard 75 cl bottle of wine.

In one embodiment, the sealing means are configured to seal a neck of diameter of up to 20.5 mm, preferably 19 mm.

In one embodiment, the first portion comprises a temperature probe, preferably located at the end of the reservoir.

In one embodiment, the gas reservoir contains pressurized gas and a fluid, so that the removal of the gas causes a removal of said fluid.

The invention also proposes a system comprising a device with a recharging coupler as described above and comprising a recharging station.

In one embodiment, the recharging station comprises:
  a gas cartridge of complementary shape to the recharging coupler, or
  a gas canister and a recharging expander of complementary shape to said coupler.

The invention also proposes an assembly comprising a container and a device as described above.

This assembly aims a kit as well as a device mounted on the container.

In one embodiment, the container comprises a fluid, said fluid on the one hand and the gas and/or the fluid stored in the reservoir on the other hand being an active ingredient and its co-formulant, or vice versa.

The invention also proposes the use, for example with said device, of a gas mixture comprising dinitrogen and argon with, in addition, sulfur dioxide in a volume proportion comprised between 0.1 and 5%, preferably 0.5 and 2% of the total for storing and preserving wine. The mixture may also comprise carbon dioxide.

The invention also proposes a method for preserving a fluid and/or pouring the fluid, comprising the following steps:
  setting up a device as described above on a container, by insertion of the first portion via a neck,
  pouring liquid out of the container by tilting of the container.

The invention also proposes the use of a device as described above for preserving and/or pouring a fluid into a container.

Indeed, this device makes it possible to pour only one glass then to preserve the fluid thereafter by avoiding its oxidation. It has therefore a dual function.

PRESENTATION OF THE FIGURES

Figure 2:
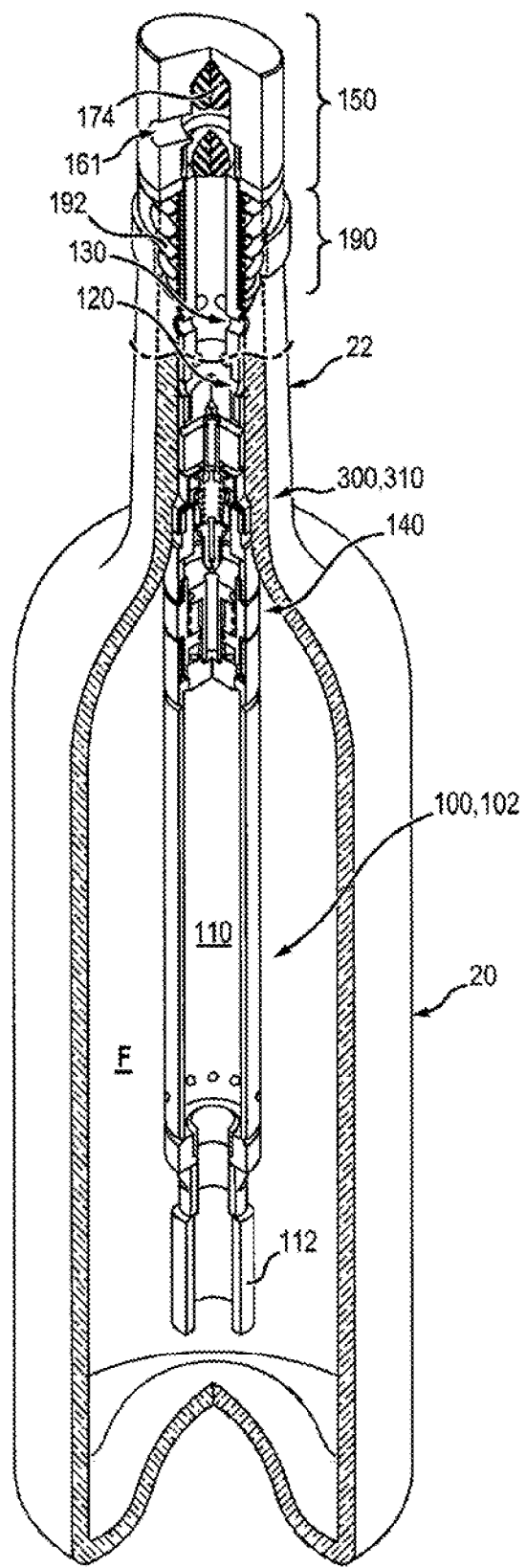
Figure 4A:
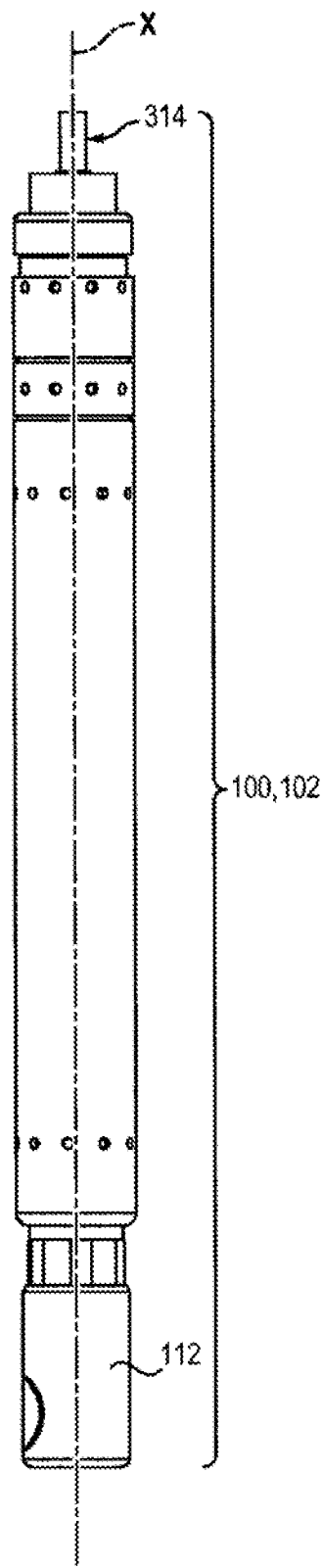
Figure 4B:
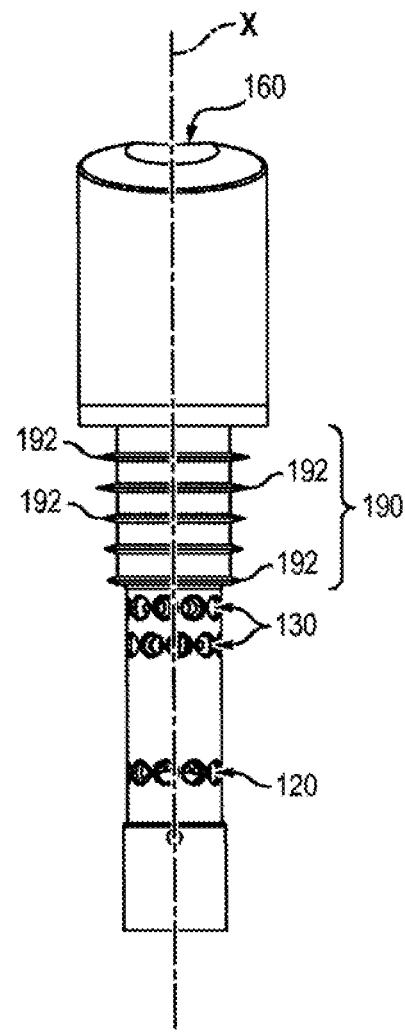
Figure 5B:
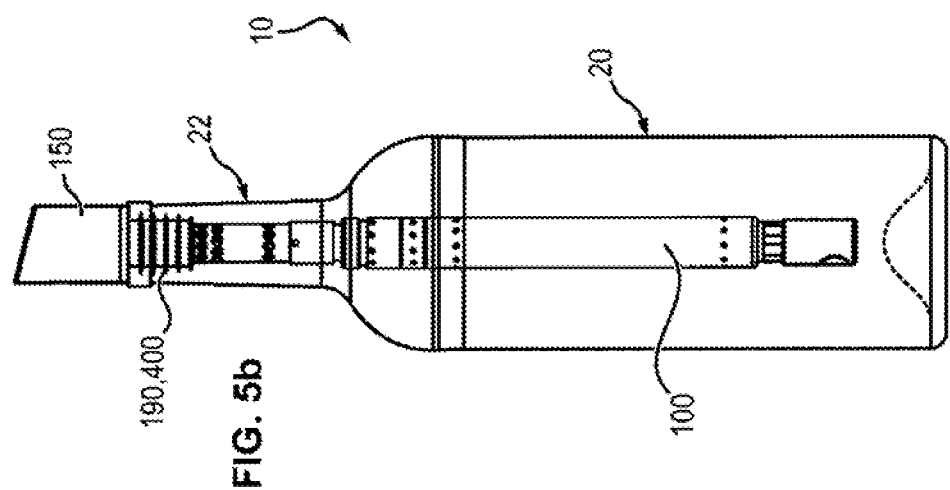
Figure 5A:
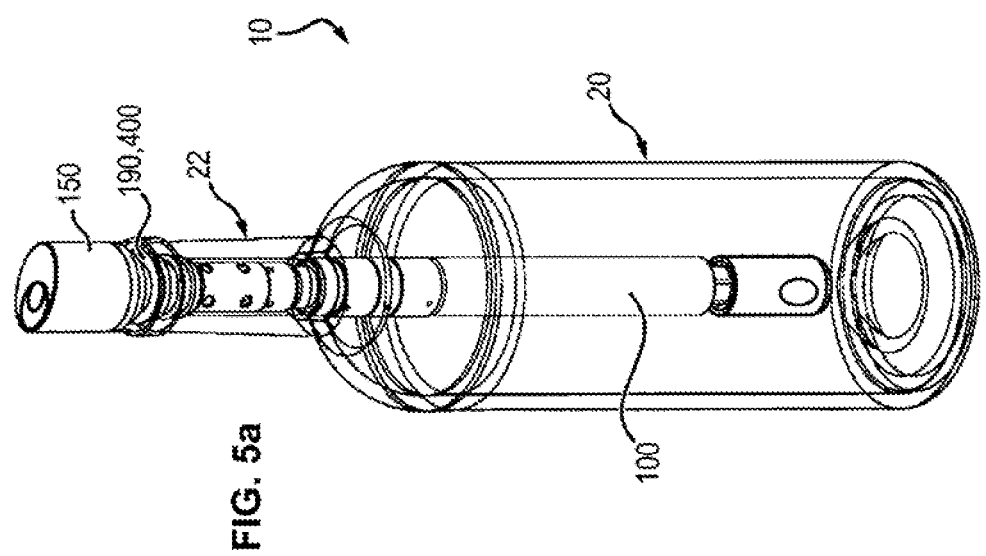
Figure 6:
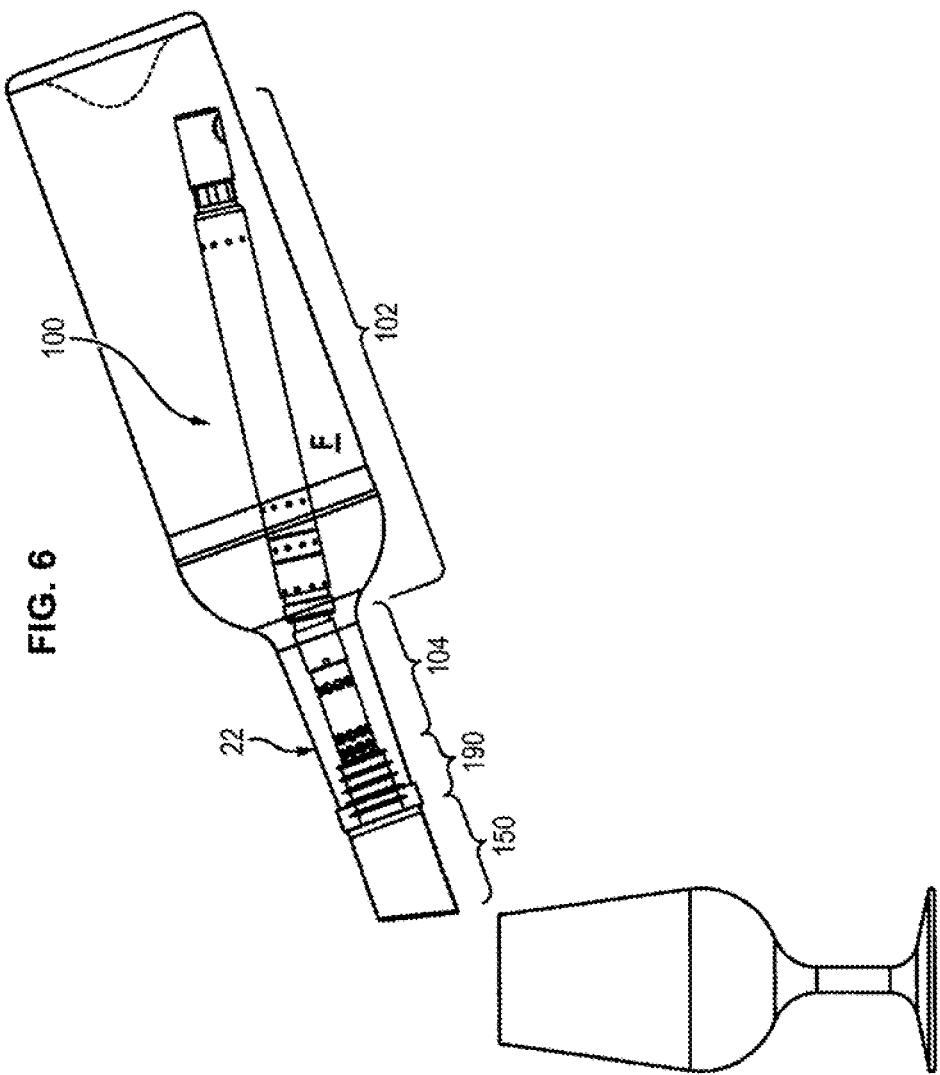

Other characteristics, objects and advantages of the invention will become apparent from the following description, which is purely illustrative and non-limiting, and which should be read with reference to the appended drawings, wherein:

FIG. 1 illustrates a single device according to one embodiment of the invention, FIG. 2 illustrates the device according to one embodiment of the invention mounted in a bottle, FIGS. 3a and 3b illustrate a sectional view of the device, by separating two hinged sub-portions by a "tilt" valve, according to one embodiment of the invention, FIGS. 4a and 4b illustrate an external view of the portions represented in FIGS. 3a and 3b, FIGS. 5a and 5b illustrate three-dimensional views of the device according to one embodiment of the invention, mounted on a container, FIG. 6 illustrates the device according to one embodiment of the invention, mounted on a container upon the pouring of fluid, with a hinged sub-portion which is slightly angularly offset.

DETAILED DESCRIPTION

With reference to FIGS. 1 to 6, a detailed description of a device 10 for pouring fluid will be described.

This device is particularly applicable for wines, spirits and other edible beverages whose physicochemical properties degrade in a few days when they are left in contact with air.

A fluid F (which is a liquid) stored in a container 20, which will be poured out of said container 20 by means of the device 10, is defined.

The container is advantageously a bottle comprising a neck 22.

The device 10 is divided into two portions, a first portion 100 and a second portion 150 which are separated by sealing means 190 (see FIG. 1).

When the device 10 is mounted on the container 20, the first portion 100 is housed inside the container, after insertion through the neck 22, and the second portion 150 remains outside the container 20 (see FIG. 2). For this, the device 10, and particularly the first portion 100, extends essentially along a longitudinal direction X.

The sealing with the container 20 is done through the sealing means 190, so that the fluid F can exit only by passing through the interior of the device 10. This will be explained later.

The first portion 100 comprises a gas reservoir 110 which is inert to prevent the degradation of the fluid F and a degassing port 120, which allows the reservoir to remove gas toward the interior of the container 20 (FIGS. 3a and 3b, 4a and 4b).

In order to control the gas flow rate exiting the reservoir 110, a control valve 300 is provided, for example at the end of a compensated expander which allows lowering the pressure of the gas and controlling the flow rate thereof when it escapes inside the bottle (see below). The degassing port 120 is in fluid communication with the control valve 300.

The first portion 100 further comprises a collection port 130 to collect the fluid from the container 20. This collection port 130 is in fluid communication with the exterior of the device 100 (FIGS. 4a and 4b).

The second portion 150 comprises for its part fluid pouring means 160 in fluid communication with the collection port 130 (FIGS. 1, 2, 4a, 4b). This fluid communication must be capable of being open, to pour the fluid F, and closed, to protect the fluid F from the outside air.

To this end, a fluid communication channel 152 connects the collection port 130 and the fluid pouring means 160. A shutter element 154 is present to obturate or not, selectively, this channel in order to fully isolate the interior of the container 20 from the ambient air external to the container 20.

The fluid pouring means 160 typically take the form of a through hole through which the fluid F can be discharged. This through hole can be located at the end of a radial duct 161 with respect to the longitudinal axis X, as illustrated in FIG. 2. Alternatively, a cutting edge 162, that is to say a quite thin edge, is used to improve the quality of the pouring (FIGS. 3b and 4b), when the hole opens substantially parallel to the longitudinal axis X.

The collection port 130 is located in the vicinity of the sealing means 190 to allow pouring a maximum of fluid F. Preferably, the collection port 130 is adjacent to said means 190. Still more preferably, the collection port 130 is as close as possible to the sealing means 190.

A plurality of collection ports 130, evenly distributed around the circumference of the first portion 100, may be provided in order to obtain a more natural flow rate, that is to say a flow rate closer to that of a container without the device 10. Several successive rings of ports 130 may thus be made (as represented in FIGS. 4a and 4b) staggered axially along the longitudinal axis of the device.

The degassing port 120 is preferably located in the vicinity of the control valve 300 to simplify the structure of the device 10. In addition, it is preferable that the degassing port 120 be located above the collection port 130 when the device 10 is tilted at more than 180° to prevent the bubbles formed from being removed (unsightly effect). This means that, longitudinally, there are the reservoir 110, the control valve 300, the degassing port 120, then the collection port 130, starting from the end of the device located towards the bottom of the container in the direction of the pouring means.

A plurality of degassing ports 120, distributed over the circumference of the first portion 100, may be provided, in order to distribute the degassing and avoid excessive formation of degassing.

No communication internal to the device 10 is required between the communication channel 152 and the control valve 300. In other words, the degassing 120 and collection 130 ports are not in fluid communication via the device 10 itself.

The gas exiting through the degassing port 120 is under slight overpressure, which pushes the fluid F towards the collection port 130.

In order to limit the pressure of the gas exiting the reservoir 110, an expander 140 is preferably provided. It is connected to an outlet of the reservoir 110 and to the degassing port 120.

In order to be maintained in place on the container 20, the device comprises fastening means 400. Nevertheless, as illustrated in particular in FIGS. 1, 3b, 5a, 5b, these fastening means 400 are preferably made by the sealing means 190. However, it is possible to provide a system for clamping or throttling the neck 22 of the container 20, in order to prevent the sealing means 190 from undergoing the mechanical stresses of holding of the device 10 when the latter is tilted, in the pouring position.

The Control Valve 300

Several embodiments for the control valve 300 are possible.

The control valve 300 must be able to enable the injection of gas into the container 20 when fluid F is desired to be poured and the gas injection is desired to be blocked when fluid F is not desired to be poured.

Preferably, the control valve 300 is driven depending on the orientation in the space of the device 10, that is to say driven by gravity.

For example: when the device 10 is maintained vertical straight, the valve 300 is blocking and when the device 10 is tilted relative to the vertical, or approaches or even exceeds the horizontal, the valve 300 is conducting. By straight is meant that the longitudinal axis X is aligned with the direction of gravity.

The valve 300 may be conducting from a certain tilting, by defining a minimum activation threshold. This allows, at the slightest displacement of the device, preventing gas from escaping from the reservoir 110. The sensitivity of the control valve can be modified depending on the needs and specifications, for example using a spring, according to the valves.

An example of such a valve is a tilt valve, described below.

Other examples of tilt valves comprise, for example, tire-type bicycle valves such as "Presta", where a lateral movement of the rod allows releasing the air, and "Schrader".

The use of bicycle valves generally requires adaptation to be made more sensitive to tilting.

The Tilt Valve

In this embodiment (FIGS. 3a, 3b and 6 in particular) the control valve 300 is a valve called tilt valve 310, that is to say it comprises two parts 312, 314 that are hinged and movable in rotation relative to each other, and enables a fluid passage when one of the two parts pivots relative to the other one.

The tilt valve 310 comprises a base 312, forming a seat, secured to the reservoir 110 and a plug 314, forming a shutter, engaged in the base 312 and able to pivot relative to the base 312 with respect to the longitudinal axis X. Two axes are defined, one for the base 312 and one for the plug 314. When the two axes are aligned (in practice here, when they are aligned along the longitudinal axis), the shutter obturates the seat and the valve 310 is blocking; as soon as the two axes are misaligned, the shutter releases a port of the seat and the valve 310 is conducting. Generally, the flow rate is proportional. The offset is limited by a stop.

Return means 316 maintain the two axes aligned, thus defining a default position. These return means 316 also ensure the aforementioned threshold effect, in the sense that the moment generated by the reservoir (and the other pivoting parts) must cause a force greater than the return means 316 for the valve 310 to be open. These return means 316 may be a spring. The choice of the return means 316 allows adjusting the sensitivity of the device.

Due to this tilt valve 310, the first portion 100 comprises two hinged sub-portions 102, 104: a first sub-portion 102 is secured to the gas reservoir 110 (see FIG. 3a, 6), via the base 312 and the expander 140 which will be described later, and a second sub-portion 104 is secured to the rest of the device 10 (see FIG. 3b, 6), where the degassing port 120, via the plug 314 is in particular located. When the first sub-portion 102 is angularly offset with respect to the longitudinal axis X, the return means 316 (in the figures a spring) is compressed, and concomitantly the valve 310 opens the gas passage from the expander 140.

There are several different tilt valve designs, but all operate generally on the same principle of two aligned or misaligned axes, as previously described.

In one embodiment, the maximum angular offset enabled by the tilt valve 310 is comprised between 5 and 7°, preferably 6°. This value depends on the length of the first portion 100 and the size of the bottle (as seen in FIG. 6).

The Valve by Button Pressure

In this variant embodiment, the control valve 300 is activated by a switch (button, trigger, switch, etc.) located on the second portion 150 (not represented in the figures), that is to say a switch must be activated to cause the exit of gas from the reservoir. The link is preferably mechanical but it can be made electrically. This requires a battery or a cell in the device 10.

The Expander

The reservoir 110 is under too much pressure for the interior of the container 20, typically 60 bars or less than 150 bars. It is therefore important to relax this gas before its injection through the degassing port 120.

For this purpose, an expander 140 is provided, at the interface between the reservoir 110 and the control valve 300 (see FIG. 3a). The expander allows lowering the pressure of gas of the reservoir at a use pressure, typically in the order of 0.8 bar (namely 1.8 bar), or even beyond, up to 4 bars (namely 5 bars), for sparkling wines.

The expander 140 is conventional and comprises, in one embodiment, a pressurized cavity 142, said cavity being open on the reservoir 110 by a typically eccentric opening 143, an expansion cavity 144, a flap 146 movable in translation longitudinally and comprising an internal channel 148 connecting the two cavities 142, 144. The mobility is made between an obturating position where the flap 146 is in contact with a wall of the pressurized cavity 142 and prevents communication between the pressurized cavity 142 and the channel 148 and between an opening position where said communication is permitted. The T-shaped flap 146 delimits the expansion cavity 144. The expander 140 further comprises an expansion element 149 in the form of a spring, which tends to press the flap 146 against the wall and prevent communication between the two cavities 142, 144. This expansion element 149 makes it possible to cause the head loss and to lower the pressure.

Before balance, the pressurized gas exits the reservoir 110 for the pressurized cavity 142 then escapes through the channel 148 then the expansion cavity 146. The pressure increases therein, which has the effect of displacing the flap 144 by compressing the expansion element 149. The pressure increases until the flap 144 obturates the internal channel 146.

The pressure in the expansion cavity 144 therefore directly depends on the stiffness of the expansion element 149, which can be changed by adjusting or changing its stiffness.

This expansion cavity 144 is in fluid communication with the control valve 300.

As soon as the pressure drops in the expansion cavity 144, the expansion element 149 decompresses and displaces the flap 146, which opens the internal channel 146. A gas injection is done again.

This expander 140 can thus balance and continuously deliver a gas flow rate at reduced pressure, the expansion element 149 generating a head loss in the gas.

Upon pouring, the fluid F flow rate directly depends on the flow rate of the expander 140. Consequently, the device 10 can have a continuous flow rate, as if the pouring was performed from a bare container 20.

Nevertheless, any design of expander is suitable here, provided that it manages to switch from the pressure of the reservoir 110, of typically 60 bars, to the expansion pressure for the container 20, comprised between 1 and 2 bars.

The Sealing Means

The sealing means 190 are disposed longitudinally between the first portion 100 and the second portion 150 (see FIGS. 1, 3b, 4b, 5b in particular). They have an annular shape to be attached around the device 100. They operate vis-à-vis the fluid F as a cap comprising an internal passage for connecting the interior and the exterior of the container 20. They are preferably secured to the device.

In order to adapt to different neck sizes (typically between 16.5 and 25 mm (Jeroboam, Methuselah for example), or between 16.5 and 20.5 mm and more generally between 16 and 17 mm or 18 and 19 mm), the sealing means 190 may be in the form of a finned annular seal 192 spaced longitudinally. The radial height of these fins 192 can increase in the direction of the second portion 150, in order to facilitate the setting up while improving the sealing.

The sealing means 190 preferably extend along a certain longitudinal distance. This is in particular the case when there is a plurality of fins 192 spaced apart. The sealing means 190 then act as means 400 for maintaining the device 10 on the container 20 and ensure that the device does not come off when the bottle is tilted: indeed, when it is tilted, the device 10 generates a torque induced by the first portion 100, which causes stresses at the sealing means 190.

Any type of seal may be suitable. In addition, mention is made to O-rings (one O-ring or several O-rings placed side by side), or hydraulic seals that can operate.

The sealing means 190 preferably comprise a stop 194, located on the side of the first portion 150, which limits the insertion of said means 190 within the neck 22. The stop 194 is in the form of a radial extension of diameter greater than that of the sealing means 190.

Generally, this stop 194 has the diameter of the first portion 150, which remains outside the bottle.

However, any type of seal or structure for sealing the setting up of the device 10 in the container 20 by preventing the passage of gas and/fluid between the neck 22 and the device 10, is suitable.

The Shutter Element

The shutter element 170 serves to close the container 20 when the device 10 is not in use (see FIGS. 2 and 3b in particular). For this purpose, it is preferably activated by the fluid flow rate being discharged, thanks to the injection of gas into the container 20.

It is essentially the shutter element 170 that determines the pressure inside the container 20. The choice of the shutter element 170 thus depends on the pressure desired to be obtained in the container 20 for the storage.

The shutter element is opened when the pressure exerted inside the container 20 (pressure of the gas and weight of the fluid F) is greater than the closing force of the shutter element 170.

Like the control valve 300, the gravity contributes to the opening position by the orientation in the space of the device 10.

In the same way, like the control valve 300, the gravity contributes to the closing position by the orientation in the space of the device 10, that is to say thanks to the gravity.

In order to ensure the sealing of the obturation, a seal 172 may be provided.

Preferably, the opening of the shutter element 170 is done thanks to the fluid flow rate and the closure is done thanks to gravity.

It is possible that the shutter element 170 comprises return means (not represented) such as a spring, to allow balancing the opening pressure of the shutter element 170. To be open, the pressure exerted on the shutter element 170 inside the container 20 has to be greater than the closing force, which then comprises the weight of the shutter element 170 and the force of the return means.

The closing position is then achieved through the return means, and generally, thanks to gravity, under the own weight of the shutter element 170.

The return element can have a simple function of providing reliability to the closed position, without exerting too much stress.

However, when the wine is sparkling or effervescent (champagne for example), the pressure within the container 20 could allow maintaining the shutter element 170 open, in the absence of return means. Indeed, a bottle of sparkling wine must be preserved at a pressure greater than 1 bar. For this purpose, the return means are dimensioned so that at rest, that is to say when the container 20 is vertical, the shutter element 170 closes the bottle well despite the pressure prevailing inside the container 20.

In one embodiment particularly suitable for fluids F to be preserved under a pressure greater than one bar (sparkling wine for example), the return means of the shutter element 170 comprise a deactivation mechanism, able to be typically activated by a push-button, which allows manually compressing the return means. This allows removing the overpressure before pouring the fluid F (just like upon opening of the sparkling wine) and pouring normally. Once the pouring has been made, the deactivation mechanism is released and the return means act again on the shutter element.

The activation of the deactivation mechanism is accessible from the first portion 150, that is to say the portion outside the container 20.

In one embodiment illustrated in FIGS. 2 and 3b in particular, the shutter element 170 is a ball 174 movable in the communication channel 152 between a seat 176 and a stop 178. The seat is located on the side of the sealing means 190 and the stop 178 on the side of the fluid pouring means. When the ball is on the seat (the device 10 is vertical, the second portion 150 is at the top), the communication channel 152 is closed. When the ball is out of the seat (for example when the device 10 is tilted at more than 180°, that is to say when the second portion 150 is lower than the first portion 100 or when a fluid F flow rate is ongoing), the channel 152 is open and the ball 174 is generally in abutment.

The ball 174 may be coated with silicone to improve the sealing.

The return means can then take the form of a spring which bears on the stop 178 or around the stop 178, so as to push the ball 174 towards its seat 176.

In one embodiment, the shutter means may be a flap movable in rotation about an axis, such as a tap or a gate valve, with a spring as a return means for maintaining the flap in the closed position, or a valve element, for example with a spring as a return means for calibrating the value of opening of the shutter means, as explained above.

The Oxygenation Duct

In one particular embodiment, the second portion 150 comprises an oxygenation duct which opens into the communication channel 152, on the side diametrically opposite to the fluid pouring means 160. This duct, which is not intended to accommodate the fluid F, serves to supply air at the time of pouring in order on the one hand to oxygenate the fluid and on the other hand to promote the atmospheric pressurization of the fluid F. it is recalled that the fluid F is under slight overpressure relative to the atmosphere, between 0.5 and 1 bar, namely 1.5 and 2 bars.

The Gas Reservoir and the Recharging

The gas reservoir 110 has a limited capacity. It is adapted to store an inert gas in a compressed form.

So that the device 10 does not have to be recharged before the container 20 is empty or substantially empty, the gas reservoir 110 must have a useful capacity at least substantially equivalent to the volume of the container 20.

For example, for a 75 cl container, a 2 cl reservoir useful at 50 bars allows having a volume of gas expanded from 1 L to 1 bar.

Preferably, the gas reservoir 110 is adapted to receive an inert gas under a pressure less than or equal to 50 bars.

To recharge the gas reservoir 110, the device comprises a recharging coupler 112 at one end (see FIGS. 1, 2, 3a, 4a) which corresponds to a free end of the first portion 100 with which a complementary coupler of a recharging station can be associated.

In the figures, the coupler 112 is a female coupler and the complementary male coupler of the recharging station is not represented. However, it is possible to have the male coupler on the device and the female coupler on the recharging station.

Several options are possible for the station.

In one embodiment, the complementary coupler is an expander connected to a gas canister. For example, the canister is at 200 bars and the expander is at 60 bars. This device requires the installation of a canister, which is generally reserved for professionals (for beer pumps in particular).

In another embodiment, the complementary coupler is a gas cartridge, comprising a useful volume greater than that of the gas reservoir, in order to enable at least one recharging. The cartridges can be used by professionals and private individuals.

Safety Valve Element

The device 10 may comprise a safety valve element (not represented) which makes it possible to avoid the pressure rise of the expansion cavity if, incidentally, there was a leak at the expander. The safety valve element then releases the gas excess. This allows preventing the high pressure from accumulating in the expansion cavity and causing the rupture of the control valve 300.

The General Shape of the Device

The device 10 extends along a longitudinal direction X. This direction corresponds to the main extension direction of the device 10. Indeed, the latter, in order to be inserted into a container 20 via the neck 22, comprises an elongate shape.

The first portion 100 and the second portion 150 are disposed along the longitudinal axis X.

As explained above, in order to be inserted via the neck 22 of a container 20, the device 10 and particularly the first portion 100 has an elongate shape along the longitudinal direction X (see FIG. 5a in particular). This form is also essentially tubular.

The Dimensions of the Device

Several variants of the device 10 may be designed according to the containers desired to be used.

Bottle of Wine

When the container 20 is a standard bottle of wine, whose neck has an internal diameter comprised between 18 and 19 mm, the first portion 150 of the device 10 then has a maximum diameter less than 18 mm. The sealing means 190 for their part have a diameter suitable for sealing the neck.

The bottles of wine concerned have generally a capacity of 75 cl, of 150 cl (magnum).

In practice, the vast majority of the bottles of wine have a neck of this dimension, except for the 37.5 cl and 50 cl bottles.

For a 75 cl bottle, a length of 305 mm of the device is suitable.

The dimensions are the same for a bottle of champagne.

Bottle of Champagne

In the case of a bottle of wine containing a pressurized gas, such as champagne or effervescent wines, the problem of preservation of the quality of the wine depends not only on the absence of oxidation, but is also related to the loss of carbon dioxide, which is dissolved in the wine, and which will be quickly released into the air after opening of the bottle, causing a fundamental organoleptic loss for this type of products, and thereby limiting the service of this type of wine by single glasses.

In this specific case, the device in question must be able to diffuse a gas comprising a proportion of carbon dioxide ($CO_2$) and of another inert gas (nitrogen type, argon . . . ), even only carbon dioxide.

The nature of the gas may therefore be different from the gas used for a non-effervescent bottle.

Furthermore, the pressure of the gas diffused into the bottle of effervescent wine must approach the value of gas pressure before uncorking (value generally comprised between 1.3 and 5 bars).

As explained above, the shutter element 170 is then preferably provided in this case with return means, in the form of a flap or spring, maintaining the ball on its seat, up to an adjustable pressure, varying from 1.3 to 5 bars, in order to prevent the gas from escaping after opening of the bottle.

As explained above, an activation mechanism, in the form of a push-button, allows activating or deactivating the return means of the shutter element 170 after and before the service of the wine. The pressure of the gas that will be applied in the bottle on the wine by the device limits the loss of the bubbles and the oxidation of the wine.

List of Bottles

There is a plurality of references of bottle rings. For example, are mentioned:

BVS 30H60, BVP 22H30, BVP 25H43, FLAT BORDEAUX 207, FLAT 18/32, SINGLE FLAT OF 16/50, FLAT LARGE CONTAINERS, FLAT LARGE CONTAINERS 42.8, FLAT LARGE CONTAINER 36.5, SINGLE FLAT OF 14, SINGLE FLAT OF 16, SPECIAL SQUARE HDG, SQUARE BOURGOGNE, SQUARE LARGE CONTAINERS 36, SQUARE MAGNUM BOURGOGNE, SQUARE MAGNUM BORDEAUX, SPECIAL FLAT 32/16.5, SPECIAL 16/50, BBP29, CORK 50.

The diameters of the necks of these bottles vary between 16.5 mm and 20.5 mm.

In practice, 95% of the internal diameters of the bottles of wine are comprised between 18 and 19 mm.

Consequently, the same device is suitable for several types of bottles.

If necessary, the device can be easily adapted, by modifying the dimensions of the maintaining means 400 and of the sealing means 190, and by adjusting the length and/or the width of the first portion 100.

Vial for Medicine or Beauty Product

Many liquid products, sensitive to oxygen or to biological or chemical contaminations require adapted packages, generally expensive and generating waste. Applications of this system to bottle-type containers or the like, allowing to maintain the chemical, organoleptic or medical qualities of the products can be developed in the future.

In addition, several applications require a mixture of two distinct products at the time of use, for example an active ingredient (gas or liquid) and its co-formulant. By using such a gas (even with liquid, see "inert gas" below) in the device, this device allows the ad hoc mixture when using the final product, without contacting the products during time when the product is stored, but only during the pouring and the use.

Temperature Probe

The device 10 may comprise a temperature probe (not represented) for measuring the temperature of the wine. Indeed, the temperature of the part is often used to know the temperature of the wine. Thanks to the device provided with a probe, since a portion thereof is immersed into the fluid F, it is possible to improve the knowledge of the wine storage conditions by knowing the temperature of the wine itself.

The probe is positioned in or on the first portion 100. Preferably, the probe is at the free end of the first portion, to be immersed into the fluid F as often as possible.

Display means may be provided, particularly on the second portion 150, in order to be easily visible by an operator. A cell or a battery is then provided to power the system with energy.

The Inert Gas

A nitrogen and/or argon mixture is preferably used. These mixtures depend on the type of wine and are already known from the state of the art.

In one embodiment, the gas comprises dinitrogen and/or argon, with sulfur dioxide. The volume proportion of sulfur dioxide is comprised between 0.1 and 5%, preferably 0.5 and 2%, preferably 1%. In one complementary embodiment, the gas mixture consists only of dinitrogen, argon and sulfur dioxide.

For champagne or other sparkling or effervescent wine, carbon dioxide may be added in the gas mixture. Alternatively, only carbon dioxide can be used.

This inert gas can be used in any wine preservation device, and particularly in the device presently described.

Furthermore, in another embodiment, it is possible to mix gas and liquid in the reservoir, so that the removal of gas towards the container F causes a spraying of the liquid contained in the reservoir. This allows, as previously indicated, applying a co-formulant to an active ingredient.

Material

The device 10 is essentially made of metal, of the stainless steel type, with the exception of a few elements such as the sealing means 190, for example.

The collection 130 and degassing 120 ports are typically made by drillings in tubes forming the device.

The device 10 may be formed by a general assembly of different parts, all substantially cylindrical and tubular.

A weight comprised between 100 g and 300 g is ideal, so as not to disturb the user.

Use Method

The device 10 is simple to use and requires almost no formation to be used.

An example will be given for a bottle of wine 20.

The operator uncorks the bottle and pours a few centiliters to taste. These few poured centiliters allow releasing volume in the bottle to allow the insertion of the device 10 without the wine overflowing.

The operator then inserts the first portion 100 into the bottle 20 and secures the device 10 by ensuring that the sealing means 190, which act as fastening means 400, are correctly set up in the neck of the bottle (FIGS. 5a, 5b).

Depending on the sampled volume, it is possible that the level of wine rises in the neck of the bottle once the device is set up.

Due to the generally dark color of the bottle and to the presence of opaque wine, the major part of the device 10 is invisible. Only the second portion 150 exceeds with its fluid pouring means 160. The device 10 therefore takes up as much room as a cap for replacing the cork cap and remains unobtrusive.

In an uptight position, the longitudinal axis X is aligned with gravity. The two axes of the tilt valve 310 are also aligned with gravity: the valve 310 is therefore in the closed position.

For the pouring, in the case of a tilt valve, the operator must perform the same maneuver as usual: he tilts the bottle and the wine will be poured almost normally, even with a slight fountain effect if the pressure in the bottle is slightly greater than 1 bar.

Indeed, in the case of the tilt valve, when the operator tilts the bottle, the axes of the tilt valve 310 are no longer aligned with gravity: the reservoir 100 (and the other secured elements), under its own weight, causes misalignment of the tilt valve 310 and thus triggers its opening (FIG. 6). The degassing from the reservoir 100 toward the interior of the bottle, via the expander 140, the control valve 310 and the degassing port 120 is then possible: the pressure balance is slightly broken, which enables the wine flow rate by the collection port 130. The wine then opens the shutter element 170 due to its flowing and to the pressure prevailing in the container 20 and is poured by the pouring means 160.

Once the desired amount is poured, the operator straightens the bottle 20, which causes the realignment of the two axes of the tilt valve 310 along the direction of gravity, and the valve 310 then returns to the closed position. In addition, the wine flow rate ceasing and as the pressure in the container 20 is equal to the external pressure, the shutter element returns to its closed position, which blocks the communication channel 152 and isolates the wine from the outside air.

As inert gas has been injected into the bottle 20 to allow the pouring, there is no risk of oxidation of the wine.

The collection port 130 cannot collect the totality of the wine of the bottle 20. However, this allows preventing the deposit from being poured.

In the case of a sparkling wine such as champagne, the method may be slightly different. Before the pouring, the operator activates the deactivation mechanism by pressing the push button. This allows removing the overpressure and allows a free pouring without fountain effect. After pouring, the operator releases the deactivation mechanism. As the bottle can then be vertical, it is possible that there is not enough gas injected from the reservoir to create the required overpressure (that is not desired to have for non-sparkling wine). For this, the operator can then simply lean the bottle, so as to release gas, until he hears a slight noise at the shutter element, corresponding to the removal of the overpressure of gas. At this time, the pressure prevailing inside the container 20 is equal to the force exerted by the shutter element and return means, that is to say the pressure reached is the one of the storage pressure.

The invention claimed is:

1. A device for pouring fluid stored in a container, by tilting of the container, the device comprising:
   a first portion which comprises at least one collection port for collecting the fluid from the container, the first portion being configured to be located inside the container when the device is mounted on the container;

a second portion which comprises fluid pouring means configured to be in fluid communication with the collection port; and sealing means separating the first portion and the second portion, the sealing means being configured to obturate the container in a sealed manner when the device is mounted on the container, the second portion being configured to be outside the container when the device is mounted on the container;

wherein the first portion further comprises a gas reservoir and a degassing port to remove gas from the reservoir towards the interior of the container;

wherein the collection port and the pouring means are in fluid communication via an internal fluid communication channel, the channel comprising a shutter element configured to obturate or open the communication channel; and wherein an opening or an obturating position of the shutter element depends on a pressure inside the container and/or a spatial orientation of the device.

2. The device of claim 1, wherein the first portion further comprises a control valve for controlling a gas flow rate toward the degassing port.

3. The device of claim 2, wherein the control valve is configured to be manually activated by a switch.

4. The device of claim 2, further comprising an expander connecting the reservoir to the control valve.

5. The device of claim 1, wherein the sealing means comprise a finned annular seal, configured to fit different diameters of the container neck.

6. The device of claim 1, wherein the sealing means extend along a certain distance along a longitudinal direction, in order to resist a torque induced by the first portion when the container is tilted.

7. The device of claim 1, wherein the gas reservoir comprises a recharging coupler for recharging the reservoir with pressurized gas.

8. The device of claim 1, wherein a maximum diameter of the first portion is less than 16 mm, so that the device is suitable for a container in the form of a standard 75 cl bottle of wine.

9. The device of claim 1, wherein the first portion comprises a temperature probe.

10. The device of claim 1, wherein the gas reservoir contains pressurized gas and a fluid, so that a removal of the gas causes a removal of the fluid.

11. A system comprising a device according to claim 1, with a recharging coupler and comprising a recharging station.

12. The system of claim 11, wherein the recharging station comprises:
a gas cartridge of complementary shape to the recharging coupler, or
a gas canister and a recharging expander of complementary shape to the coupler.

13. An assembly comprising a container and the device according to claim 1.

14. A device for pouring fluid stored in a container, by tilting of the container, the device comprising:
a first portion which comprises at least one collection port for collecting the fluid from the container, the first portion being configured to be located inside the container when the device is mounted on the container;

a second portion which comprises fluid pouring means configured to be in fluid communication with the collection port; and sealing means separating the first portion and the second portion, the sealing means being configured to obturate the container in a sealed manner when the device is mounted on the container, the second portion being configured to be outside the container when the device is mounted on the container;

wherein the first portion further comprises a gas reservoir and a degassing port to remove gas from the reservoir towards the interior of the container;

wherein the collection port and the pouring means are in fluid communication via an internal fluid communication channel, the channel comprising a shutter element configured to obturate or open the communication channel;

wherein the shutter element comprises return means tending to maintain the shutter element in an obturating position; and wherein the return means of the shutter element further comprise a deactivation mechanism for deactivating the return means.

15. A device for pouring fluid stored in a container, by tilting of the container, the device comprising:
a first portion which comprises at least one collection port for collecting the fluid from the container, the first portion being configured to be located inside the container when the device is mounted on the container;

a second portion which comprises fluid pouring means configured to be in fluid communication with the collection port; and sealing means separating the first portion and the second portion, the sealing means being configured to obturate the container in a sealed manner when the device is mounted on the container, the second portion being configured to be outside the container when the device is mounted on the container;

wherein the first portion further comprises a gas reservoir and a degassing port to remove gas from the reservoir towards the interior of the container;

wherein the first portion further comprises a control valve for controlling a gas flow rate toward the degassing port;

wherein the control valve is driven by a spatial orientation of the device; and wherein the control valve is a tilt valve comprising two portions pivoting relative to each other, a pivoting of the two portions being caused by an effect of a weight in particular of the gas reservoir when the device is tilted.

* * * * *